(12) United States Patent
Brand et al.

(10) Patent No.: US 7,540,450 B2
(45) Date of Patent: Jun. 2, 2009

(54) AIRCRAFT PROPULSION SYSTEM

(75) Inventors: Joseph Horace Brand, Mississauga (CA); Kevin Dooley, Mississauga (CA); Michael Dowhan, Milton (CA); Nashed Youssef, Mississauga (CA); Richard Harvey, Ancaster (CA); William Savage, Milton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 10/892,125

(22) Filed: Jul. 16, 2004

(65) Prior Publication Data

US 2006/0011780 A1    Jan. 19, 2006

(51) Int. Cl.
*B64D 27/00* (2006.01)
(52) U.S. Cl. ........................................................ 244/54
(58) Field of Classification Search .................... 244/13, 244/53 R, 55, 60, 54; 60/224, 226.1
See application file for complete search history.

(56) References Cited

U.S. PATENT DOCUMENTS

| | | | | | |
|---|---|---|---|---|---|
| 2,178,725 | A | * | 11/1939 | Lawrence | 74/661 |
| 2,783,003 | A | * | 2/1957 | Ralston et al. | 244/54 |
| 2,961,189 | A | | 11/1960 | Doak | |
| 3,033,492 | A | | 5/1962 | Rowe | |
| 3,038,683 | A | | 6/1962 | Rowe | |
| 3,054,577 | A | * | 9/1962 | Wolf et al. | 60/226.1 |
| 3,167,273 | A | | 1/1965 | Calderon | |
| 3,179,354 | A | | 4/1965 | Calderon | |
| 3,212,733 | A | * | 10/1965 | Kutney | 244/54 |
| 3,284,027 | A | | 11/1966 | Mesniere | |
| 3,302,907 | A | * | 2/1967 | Wilde et al. | 244/55 |
| 3,312,426 | A | | 4/1967 | Fowler | |
| 3,547,379 | A | | 12/1970 | Kappus et al. | |
| 3,790,105 | A | | 2/1974 | Eickman | |
| 4,116,405 | A | | 9/1978 | Bacchi et al. | |
| 4,222,235 | A | * | 9/1980 | Adamson et al. | 60/226.1 |
| 4,452,567 | A | | 6/1984 | Treby et al. | |
| 4,469,294 | A | | 9/1984 | Clifton | |
| 4,500,055 | A | | 2/1985 | Krojer | |
| 4,537,373 | A | | 8/1985 | Butts | |
| 4,605,185 | A | | 8/1986 | Reyes | |
| 4,676,458 | A | | 6/1987 | Cohen | |
| 4,676,459 | A | * | 6/1987 | Seefluth | 244/65 |
| 4,917,332 | A | | 4/1990 | Patterson, Jr. | |
| 5,320,305 | A | | 6/1994 | Oatway et al. | |
| 5,368,256 | A | | 11/1994 | Kalisz et al. | |
| 5,449,129 | A | | 9/1995 | Carlile et al. | |
| 5,666,803 | A | * | 9/1997 | Windisch | 60/232 |

(Continued)

FOREIGN PATENT DOCUMENTS

EP    0 272 822    3/1991

OTHER PUBLICATIONS

"Pegasus Vectored-thrust Turbofan Engine", International Historical Mechanical Engineering Landmark, Jul. 24, 1993, International Air Tattoo '93, RAF Fairford.

(Continued)

*Primary Examiner*—Tien Dinh
(74) *Attorney, Agent, or Firm*—Ogilvy Renault LLP

(57) ABSTRACT

An aircraft propulsion system comprises a power plant driving a number of outboard propulsion units to propel a fixed wing aircraft.

10 Claims, 3 Drawing Sheets

U.S. PATENT DOCUMENTS

| | | | |
|---|---|---|---|
| 5,687,561 | A | 11/1997 | Newton |
| 6,039,287 | A * | 3/2000 | Liston et al. .................. 244/54 |
| 6,079,200 | A | 6/2000 | Tubbs |
| 6,170,780 | B1 * | 1/2001 | Williams ..................... 244/15 |
| 6,543,718 | B2 | 4/2003 | Provost |
| 6,688,552 | B2 * | 2/2004 | Franchet et al. ............ 244/12.3 |
| 6,792,745 | B2 * | 9/2004 | Wojciechowski ............ 60/224 |
| 6,868,664 | B2 | 3/2005 | Albero et al. |
| 2004/0025493 | A1 | 2/2004 | Wojciechowski |

OTHER PUBLICATIONS

V/STOL Aircraft Systems Technical Committee, American Institute of Aeronautics and Astronautics, www.aiaa.org/tc/vstol/.

Les Hawker P.1127/Kestrel/XV6A et P.1154, Les concepts de M. Wibault, prototypes.free.fr/p1127/p1127-2.htm.

Moller International, www.moller.com/; www.moller.com/skycar/m400/;media.moller.com/news/hoverstills/;www.moller.com/skycar/technoogy/; www.moller.com/skycar/safety/; www.moller.com/skycar/applications/;www.moller.com/skycar/performance/; www.moller.com/skycar/operation/; www,moller.com/skycar/advantages/;www.moller.com/skycar/m150/.

Grumman 698 VTOL Design, Kulair, Inc., www.kulikovair.com/grum698.htm.

John Farley's Lecture, The Harrier Development Story—by John Farley OBE AFC CEng, www.harrier.org.uk/history/history.farley.htm.

Tilt Ducts, Doak 16 VZ-4.

Transcendental Model 1G, The Transcendental Aircraft Company.

All The World's Rotorcraft, avia.russian.ee/.

* cited by examiner

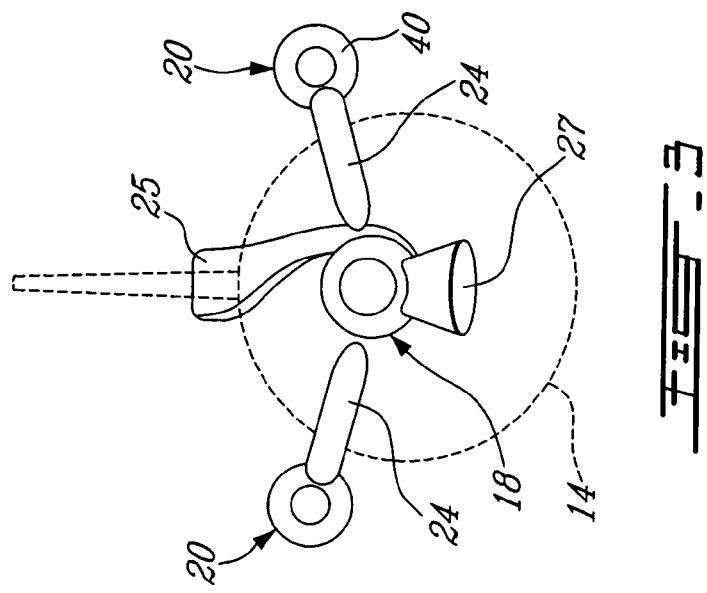
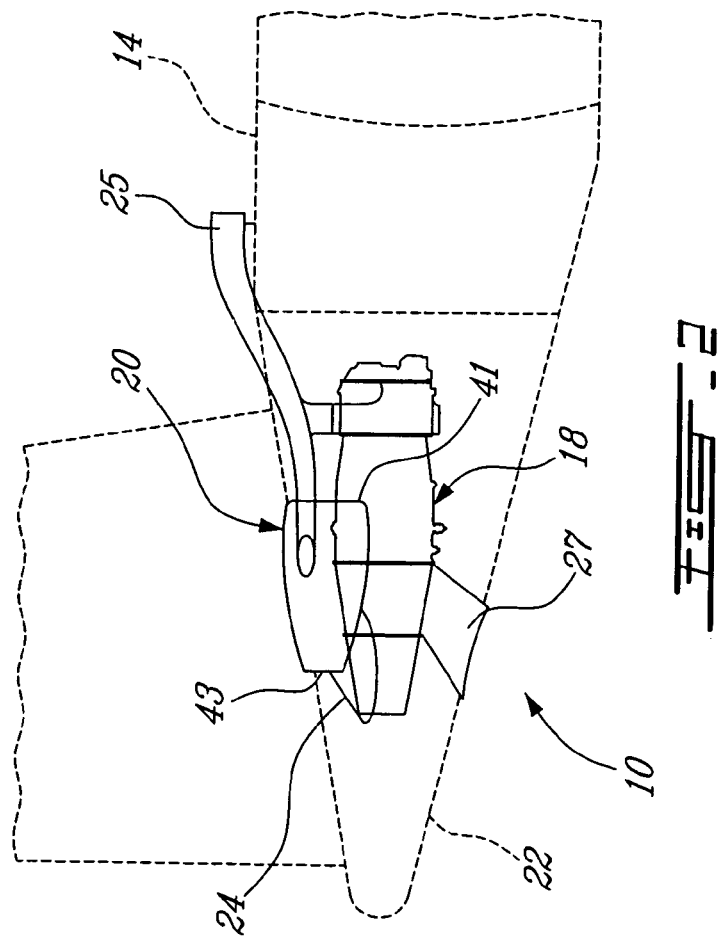

AIRCRAFT PROPULSION SYSTEM

TECHNICAL FIELD

The invention relates generally to aircrafts and, more particularly, to an improved aircraft propulsion system.

BACKGROUND OF THE ART

Small twin-engine aircraft require the same reliability, performance, specific weight and cost for their low thrust turbofan engines as are required for much larger units. However, engine performance can decrease as the size of the turbo machine reduces, as does the thrust to weight ratio, since component thickness cannot be reduced proportionally with thrust. The cost of engine components also does not scale linearly with thrust making the cost per unit of thrust for small engine relatively higher than for a bigger engine.

Accordingly, there is a need to provide an improved aircraft propulsion system which addresses these.

SUMMARY OF THE INVENTION

It is therefore an object of this invention to provide an improved aircraft propulsion system.

In one aspect, the present invention provides an aircraft propulsion system comprising a single gas turbine engine, and at least two propulsion units driven by the single gas turbine engine and selectively independently disconnectable therefrom to permit in-flight shutdown of a damaged propulsion unit while still allowing the remaining propulsion unit(s) to be driven by the gas turbine engine.

In a second aspect, the present invention provides a fixed wing aircraft comprising a fuselage and a main fixed wing extending laterally therefrom, a gas turbine engine and at least two forward-facing propulsion units mounted outboard of the fuselage, wherein the forward-facing propulsion units are powered by the gas turbine engine independently from one another to permit selective shutdown of at least one of said propulsion units while the at least one other propulsion unit is still being powered by the gas turbine engine.

In a third aspect, the present invention provides a fixed wing aircraft comprising a fuselage, fixed wings extending laterally from the fuselage, a single gas turbine engine mounted to the fuselage, at least two forward-facing propulsion units mounted to pylons extending laterally outwardly from the fuselage, and means for transmitting power from the single gas turbine engine to the at least two propulsion units.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2 is a side view of the propulsion system shown in FIG. 1;

FIG. 3 is a rear end view of the propulsion system shown in FIG. 1;

DETAILED DESCRIPTION OF THE PREFERRED EMBODIMENTS

Figure 1:
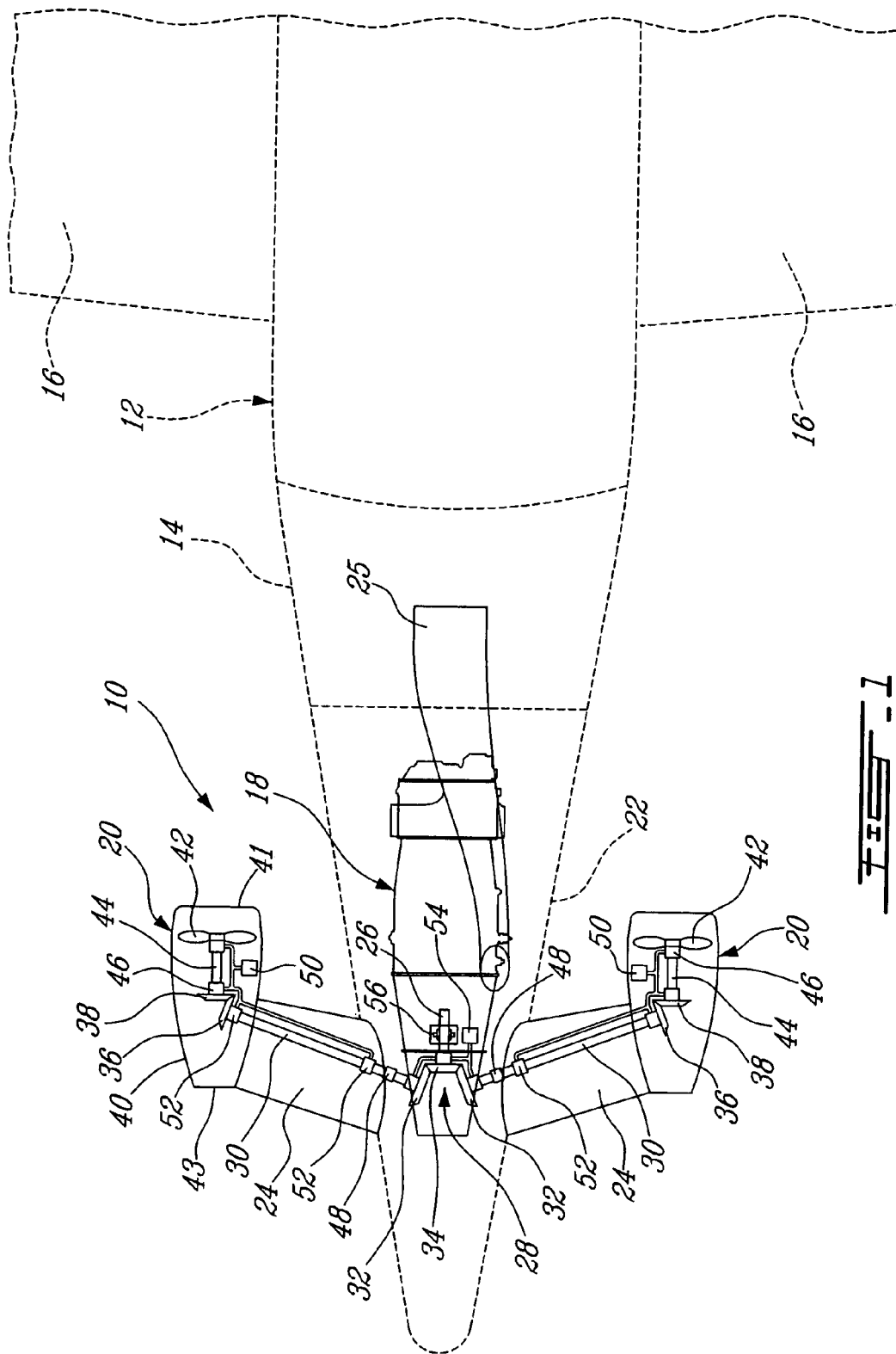
FIG. 1 is a top plan view of a propulsion system integrated in the tail section of a fixed wing aircraft in accordance with an embodiment of the present invention.

FIG. 1 illustrates an embodiment of an aircraft propulsion system 10 which is specifically well-adapted for small aircrafts conventionally propelled by small twin engines. However, it is understood that the propulsion system 10 could be applied to other types of conventional fixed wing aircrafts.

As shown in FIG. 1, the propulsion system 10 is integrated in a fixed wing aircraft 12 having a fuselage 14, and a pair of fixed wings 16 extending laterally from the fuselage 14. The propulsion system 10 generally comprises a single gas turbine engine 18 driving a pair of aerodynamic propulsion units 20 symmetrically arranged relative to a central longitudinal axis of the fuselage 14. The gas turbine engine 10 can be mounted in an engine compartment defined in the tail section 22 of the fuselage 14 rearwardly of the fixed wings 16. The propulsion units 20 are mounted outboard of the fuselage 14 at the distal end of short length pylons 24 extending laterally outwardly from opposed sides of the tail section 22 of the fuselage 14. As shown in FIGS. 1 to 3, the propulsion units 20 are mounted to the pylon 24 with their axes similarly aligned to the longitudinal axis of the aircraft and in relatively close proximity to the fuselage 14 (i.e. close to the central axis of the aircraft as compared to conventional wing mounted propulsion units) in order to minimize thrust asymmetry in the event of the failure of one of the units 20 and to minimize transmission lengths for transmission 28. It is also for that particular reason that it is advantageous to mount the propulsion units 20 at the tail of the aircraft where the width of the fuselage 14 is reduced.

The gas turbine engine 18 can be provided in the form of a conventional turboshaft engine. Alternatively, the gas turbine engine 18 could be based on an existing turboprop engine, of established reliability, and preferably with the reduction gearbox (RGB) removed. In the described embodiment, a Pratt & Whitney Canada PT6 engine is preferred. The engine 18 may be installed with horizontal, vertical or inclined axis relative to the aircrafts depending of the aircraft. An air intake 25 extends preferably outwardly from a top surface of the fuselage 14 for allowing the engine 18 to be fed with fresh air. The combustion gases generated by the engine 18 are rejected rearwardly of the airplane 12 through an exhaust 27 (FIGS. 2 and 3) extending through an undersurface of the tail section 22. The engine 18 typically has a low spool 26 and an independently rotatable high spool (not shown).

The propulsion units 20 can be adapted to different applications: a conventional fan for relatively high speed aircraft, a low pressure fan for intermediate speed aircraft and a ducted propeller for low speed aircraft or propeller aircraft modernization or replacement. In the illustrated embodiment, each propulsion unit 20 comprises a forward-facing axisymetric nacelle 40 combined with a ducted fan case. The nacelle 40 is open-ended and has a circumferentially extending inlet lip 41 and a inwardly tapering tail portion 43. Each propulsion units 20 further comprises a fan 42 mounted on a shaft 44 rotatably supported centrally within the nacelle 40 by bearings 46. When powered, the fans 42 generated a thrust in a rearward direction to propel the aircraft 12 forward.

As shown in FIG. 1, the shafts 44 of the propulsion units 20 are preferably both mechanically driven by the low spool 26 of the gas turbine engine 18 via a two branch bevel gear transmission 28. A brake 56 is provided before the transmission 28 divides into branches for acting on the low spool 26. The transmission 28 comprises a pair of transmission shafts 30 extending through respective hollow pylons 24. Each shaft 30 carries at a first end thereof a bevel gear 32 in meshing engagement with a central driving bevel gear 34 mounted at the end of the low spool shaft. A second bevel gear 36 is mounted at a second opposed end of each transmission shaft 30 for meshing engagement with a corresponding driven bevel gear 38 mounted at the rear end of each fan shaft 44. An overload decoupling device 48 is provided between the first and second opposed ends of each transmission shafts 30 to protect the other transmission branch in case that one of the aerodynamic propulsion units 20 seizes as a result of a large bird impact, a fan blade off or other foreign object damages (FOD). Each overload decoupling device 48 can be set for example, to accept the load occurring during the ingestion of a small bird but set to release or disconnect above this level. The operation of the overload decoupling device 48 is preferably automatic and without additional pilot actuation capability requirement but may also include a manual activation capability.

The above described embodiment is advantageous in that it can safely be operated despite critical damage or malfunction of one of the propulsion units 20. The overload decoupling devices 48 provide for the disconnection of the damaged propulsion unit. The aircraft 12 will continue flying (at lower speed) with the remaining propulsion unit 20.

Each overload decoupling device 48 is preferably provided in the form of a clutch adapted to disconnect the associated propulsion unit 20 from the gas turbine engine 18 to permit in-flight shutdown of the unit 20 without affecting operation of the remaining unit 20. Other devices having the functionality described herein may also be suitable.

As shown in FIG. 1, each propulsion unit 20 is preferably provided with an integrated lubrication system 50 for lubricating the bearings 46 and any other fan components requiring lubrication. Each propulsion unit lubrication system 50 also lubricates the transmission components, including the transmission shaft bearings 52, up to the associated overload decoupling device 48. The heat generated in the bearings 46 of the damage propulsion unit 20 and in the transmission up to the decoupling device 48, will be dissipated in the nose cone 43 and the inlet lip 41 of the unit 20, thereby providing anti-icing for both. See applicant's co-pending application Ser. No. 10/628,368 incorporated herein by reference. In the event of one of the propulsion units 20 is damaged or shutdown its lubrication system 50 may also preferably be shut down, either automatically and/or manually.

The two branches of the transmission 28 from the engine 18 to the decoupling devices 48 are preferably lubricated by the main engine lubrication system 54.

Movement (e.g. slight tilting) of the aerodynamic propulsion units 20 may be used for weight compensation of the aircraft 12, if desired, if suitable tilting means are provided, for example via moving pylons 24.

For some aircraft designs, the gas turbine engine 18, the two aerodynamic propulsion units 20, the pylons 24, the transmission 28 and all the remaining system components could be assembled in a single structural aircraft propulsion module. The aircraft propulsion module would be supplied as a unit, to be integrated with the aircraft 12. The aircraft propulsion module frame in such an embodiment would preferably be structural, to compensate for the opening in the fuselage 14 into which the unit is inserted. This propulsion module would reduce installation time and would preferably be readily removable and replaceable for ease of inspection, maintenance and replacement.

In use, both propulsion units 20 are driven from the low spool 26 of the gas turbine engine 18 via the mechanical bevelled gear transmission 34. In the event that the torque required to drive one of the fan shafts 44 becomes greater than a pre-set limit value of the decoupling devices 48, as a result, for instance, of the ingestion of a bird in one of the units 20, then the damaged unit 20 will automatically be disconnected from the low spool 26 by device 48, while engine 18 remains drivingly connected to the other propulsion unit 20, thereby allowing the aircraft to continue its flight with a single propulsion unit 20. Propulsion units 20 are thus preferably sized and configured to provide safe flight in this "one unit inoperative" mode.

Figure 4:
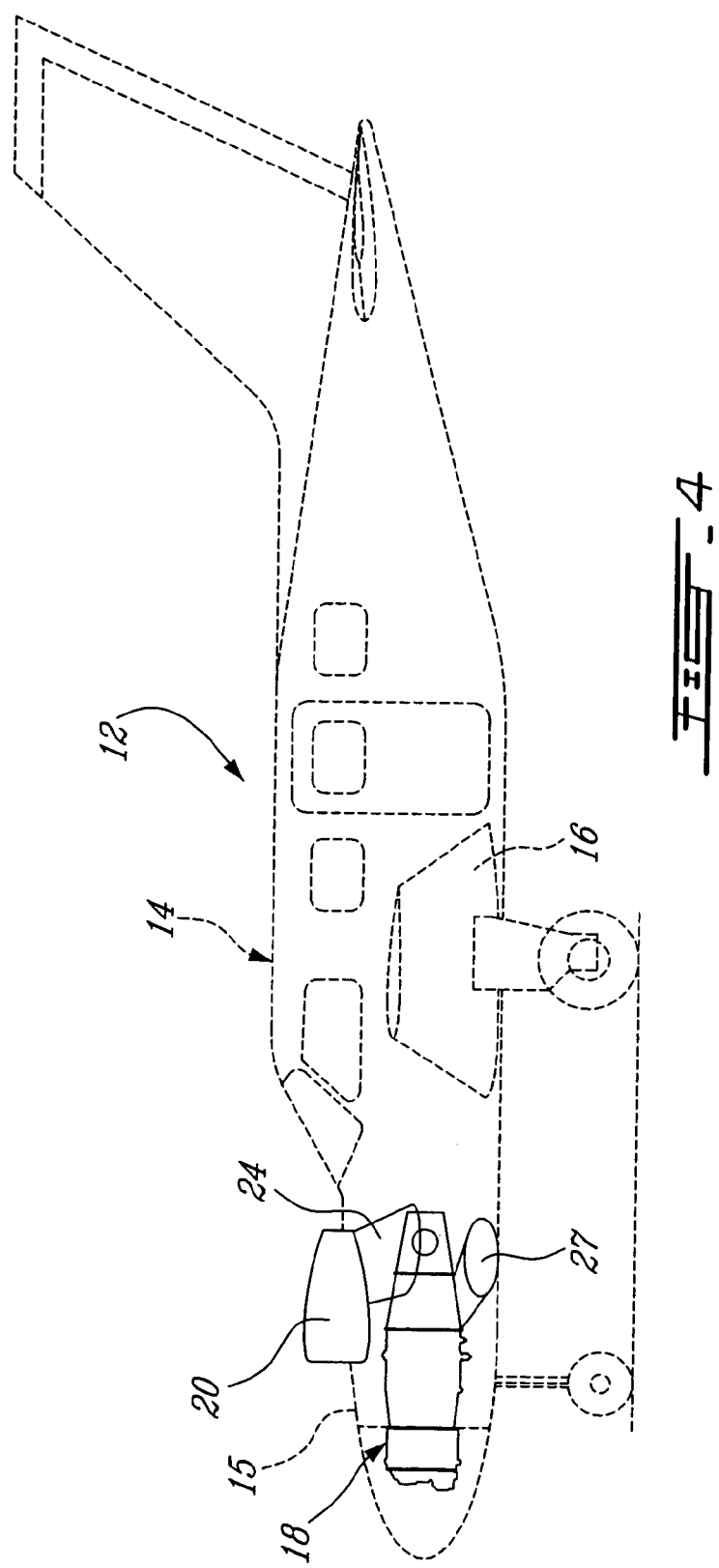
FIG. 4 is a side view of a propulsion system integrated in the nose of a small fixed wing aircraft in accordance with another embodiment of the present invention.

FIG. 4 illustrates another embodiment of the present invention, wherein like reference numerals designate like parts. The embodiment shown in FIG. 4 differs from the embodiment shown in FIG. 1 in that the propulsion system 10 is mounted to the front nose portion 15 of the aircraft fuselage 14. The engine 18 is received in an engine compartment defined within the front nose portion 15 and the pylons 24 supporting the propulsion units 20 extends laterally outwardly from opposite sides of the fuselage 14 at the rear of the engine 18. This placement of the propulsion system 10 also contributes to minimize the distance between the propulsion units 20 and the central axis of the aircraft 12, thereby minimizing effect of asymmetric thrust in the event of the failure of one of the units 20 and minimizing transmission lengths for transmission 28.

The propulsion system 10 provided with safety and reliability in mind, while also offering better performances than two small turbofan engines of equivalent thrust (longer airfoils in the turboshaft engine, axisymetric nacelles, fan speed independent from turbine speed). The system has a better reliability than a single engine propeller driven aircraft or a single turbofan driven aircraft. Furthermore, it provides for lower noise level (fan speed can be optimized for noise requirements, and there is no jet noise created by the units). Still another benefit of the propulsion system 10 is its low manufacturing cost and low direct operating cost. The propulsion system is also readily adaptable to almost any flight requirements and offers great flexibility of installation (horizontal, vertical or inclined engine axis).

The above description is meant to be exemplary only, and one skilled in the art will recognize that changes may be made to the embodiments described without department from the scope of the invention disclosed. For example, the overload decoupling device could take the form of a single differential device such as those used in car transmissions. In fact, any device performing the selective decoupling described may be used. Although a bevel gear transmission is described, any suitable mechanical transmission arrangement may be used. Also, the mechanical transmission could be replaced by electrical power transmitted from the engine 18 to electric motors for driving the units 20. It is also understood that more than two propulsion units 20 may be used. The inlet, outlet and engine arrangements may be modified to suit the designer. Although the gas turbine power source is preferred any suitable engine or power source may be used. Still other modifications which fall within the scope of the present invention will be apparent to those skilled in the art, in light of a review of this disclosure, and such modifications are intended to fall within the appended claims.

The invention claimed is:

1. A fixed wing aircraft comprising a fuselage, fixed wings extending laterally from the fuselage, a single gas turbine engine substantially enclosed within the fuselage, the gas turbine engine having an exhaust extending through a lower portion of the fuselage, at least two forward-facing propulsion units fixedly mounted in said position to pylons extending laterally outwardly from the fuselage, and means for mechanically connecting the single gas turbine engine in driving engagement with the at least two propulsion units, said means including transmission shafts extending outwardly of the fuselage through the pylons.

2. A fixed wing aircraft as defined in claim 1, wherein the pylons are provided where the fuselage has a reduced width.

3. The fixed wing aircraft as defined in claim 1, wherein the pylons are provided aft of the fixed wings.

4. The fixed wing aircraft as defined in claim 1, wherein the pylons are provided at a tail section of the fuselage.

5. The fixed wing aircraft as defined in claim 1, wherein the pylons are provided at a front nose section of the fuselage.

6. The fixed wing aircraft as defined in claim 1, wherein the at least propulsion units are symmetrically disposed relative to a central longitudinal axis of the aircraft and at a location where the fuselage has a reduced width.

7. The fixed wing aircraft as defined in claim 1, wherein said means comprise a bevel geared transmission having an independent output for each of the at least two propulsion units, each output being coupled to an overload clutch to provide for selective independent disconnection of the propulsion units from the gas turbine engine.

8. The fixed wing aircraft as defined in claim 1, wherein said means include a mechanical transmission drivingly connecting the single gas turbine engine to the at least two propulsion units, said mechanical transmission comprising at least one overload decoupling device.

9. The fixed wing aircraft as defined in claim 8, wherein said at least one overload decoupling device comprises a clutch operatively coupled to each of said transmission shafts.

10. The fixed wing aircraft as defined in claim 1, wherein the engine is selected from a group consisting of: turbo shaft and turboprop engines.

\* \* \* \* \*